US 8,708,169 B1
Apr. 29, 2014

(12) United States Patent
Chen (10) Patent No.: US 8,708,169 B1
(45) Date of Patent: Apr. 29, 2014

(54) COMBINATION CABINET (71) Applicant: Shun-Teng Chen, Zhongli (TW)

(72) Inventor: Shun-Teng Chen, Zhongli (TW)

(*) Notice: Subject to any disclaimer, the term of this patent is extended or adjusted under 35 U.S.C. 154(b) by 0 days.

(21) Appl. No.: 13/754,975

(22) Filed: Jan. 31, 2013

(51) Int. Cl.
*A47B 43/04* (2006.01)
*F16B 7/00* (2006.01)

(52) U.S. Cl.
USPC ........ 211/189; 211/182; 312/265.4; 403/187; 403/252

(58) Field of Classification Search
USPC ......... 211/103, 123, 182, 187, 189, 190, 191, 211/192, 193, 204, 206, 207; 312/140, 312/265.1–265.4; 403/187, 188, 252, 255, 403/256
See application file for complete search history.

(56) References Cited

U.S. PATENT DOCUMENTS

| | | | | |
|---|---|---|---|---|
| 2,345,650 A * | 4/1944 | Attwood | | 403/21 |
| 3,150,903 A * | 9/1964 | Chapman et al. | | 312/265.4 |
| 3,178,244 A * | 4/1965 | Reiss et al. | | 312/265.4 |
| 3,250,582 A * | 5/1966 | Kassimir | | 312/108 |
| 3,458,052 A * | 7/1969 | Kann | | 211/193 |
| 3,534,517 A * | 10/1970 | Kann | | 52/239 |
| 3,672,710 A * | 6/1972 | Kroopp | | 403/252 |
| 3,749,432 A * | 7/1973 | Janssen | | 52/476 |
| 3,846,944 A * | 11/1974 | Lambert | | 52/236.3 |
| 3,892,189 A * | 7/1975 | Killam | | 108/109 |
| 4,017,199 A * | 4/1977 | Strassle | | 403/264 |
| 4,056,196 A * | 11/1977 | Brauning | | 211/207 |
| 4,419,938 A * | 12/1983 | Kaut | | 108/190 |
| 4,907,388 A * | 3/1990 | Siahatgar | | 52/481.2 |
| 4,997,240 A * | 3/1991 | Schmalzl et al. | | 312/265.4 |
| 5,277,512 A * | 1/1994 | Dwillies | | 403/348 |
| 5,609,402 A * | 3/1997 | Kemp | | 312/265.4 |
| 5,683,197 A * | 11/1997 | Pihl | | 403/170 |
| 5,848,500 A * | 12/1998 | Kirk | | 52/79.1 |
| 5,997,117 A * | 12/1999 | Krietzman | | 312/265.4 |
| 6,059,322 A * | 5/2000 | Nagai et al. | | 285/125.1 |
| 6,547,088 B1 * | 4/2003 | Wang | | 211/187 |
| 2001/0004432 A1* | 6/2001 | Pfister | | 403/188 |
| 2002/0017839 A1* | 2/2002 | Wei | | 312/265.1 |
| 2003/0107305 A1* | 6/2003 | Kusztal et al. | | 312/223.3 |
| 2003/0152422 A1* | 8/2003 | Popovski | | 403/255 |
| 2004/0036389 A1* | 2/2004 | Tsai | | 312/265.4 |

FOREIGN PATENT DOCUMENTS

DE 3926598 C1 * 10/1990 ............... F16B 7/22
GB 2052003 A * 1/1981 ............... E04B 2/76

* cited by examiner

*Primary Examiner* — Joshua Rodden
(74) *Attorney, Agent, or Firm* — Alan Kamrath; Kamrath IP Lawfirm, P.A.

(57) ABSTRACT

A combination cabinet includes a plurality of upright posts, a plurality of crossbars arranged between the upright posts, a plurality of connectors mounted between the upright posts and the crossbars to connect the upright posts and the crossbars, and a plurality of rotation knobs mounted between the crossbars and the connectors. Thus, the upright posts and the crossbars are combined together by interaction of the connectors and the rotation knobs. In addition, when the crossbars are unlocked from the upright posts, the crossbars are moved freely relative to the upright posts to adjust the position of the crossbars relative to the upright posts.

12 Claims, 8 Drawing Sheets

COMBINATION CABINET

BACKGROUND OF THE INVENTION

1. Field of the Invention

The present invention relates to a house furniture and, more particularly, to a combination cabinet.

2. Description of the Related Art

A conventional combination cabinet comprises two side plates, a top plate mounted between the side plates, a bottom plate mounted between the side plates, a drawer mounted between the side plates, and a plurality of separation plates mounted between the side plates and located between the top plate and the bottom plate. However, the conventional combination cabinet has a fixed structure so that the user cannot change and adjust the relative positions of the plates of the conventional combination cabinet according to their practical requirement. In addition, the distance between the separation plates is fixed and cannot be adjusted freely.

BRIEF SUMMARY OF THE INVENTION

In accordance with the present invention, there is provided a combination cabinet, comprising a plurality of upright posts, a plurality of crossbars arranged between the upright posts, a plurality of connectors mounted between the upright posts and the crossbars to connect the upright posts and the crossbars, and a plurality of rotation knobs mounted between the crossbars and the connectors. Each of the upright posts has a periphery provided with a plurality of guide tracks. Each of the crossbars has an interior provided with a mounting hole. Each of the crossbars has a surface provided with a passage. The passage of each of the crossbars has a periphery provided with an entrance. Each of the connectors has a first side provided with a guide rail mounted in a respective one of the guide tracks of a respective one of the upright posts and a second side provided with a mounting portion mounted in the mounting hole of a respective one of the crossbars. Each of the connectors has a surface provided with a slot. The slot of each of the connectors has an end provided with an abutting edge aligning with the passage of the respective crossbar. Each of the rotation knobs has a first side provided with a connecting portion extended through the passage of a respective one of the crossbars and the slot of a respective one of the connectors and a second side provided with an operation portion abutting the respective crossbar. The connecting portion of each of the rotation knobs has a periphery provided with a pressing protrusion that is extended through the entrance of the passage of the respective crossbar and is rotatable to press the abutting edge of the slot of the respective connector. Each of the rotation knobs is rotatable to press the respective upright post, the respective crossbar and the respective connector.

The primary objective of the present invention is to provide a combination cabinet that is assembled solidly and stably.

According to the primary advantage of the present invention, the upright posts and the crossbars are combined together solidly and stably by interaction of the connectors and the rotation knobs so that the combination cabinet has a steady-state structure without producing vibration easily.

According to another advantage of the present invention, when the crossbars are unlocked from the upright posts, the crossbars are moved freely relative to the upright posts to adjust the position of the crossbars relative to the upright posts according to the practical condition, thereby satisfying the user's requirement.

According to a further advantage of the present invention, the crossbars are locked onto and unlocked from the upright posts by rotation of the rotation knobs so that the crossbars are combined with and detached from the upright posts easily and quickly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 7b is a cross-sectional assembly view of the combination cabinet as shown in FIG. 7a.

DETAILED DESCRIPTION OF THE INVENTION

Referring to the drawings and initially to FIGS. 1-4, a combination cabinet in accordance with the preferred embodiment of the present invention comprises a plurality of upright posts 1, a plurality of crossbars 2 arranged between the upright posts 1, a plurality of connectors 3 mounted between the upright posts 1 and the crossbars 2 to connect the upright posts 1 and the crossbars 2, and a plurality of rotation knobs 4 mounted between the crossbars 2 and the connectors 3.

Figure 1:
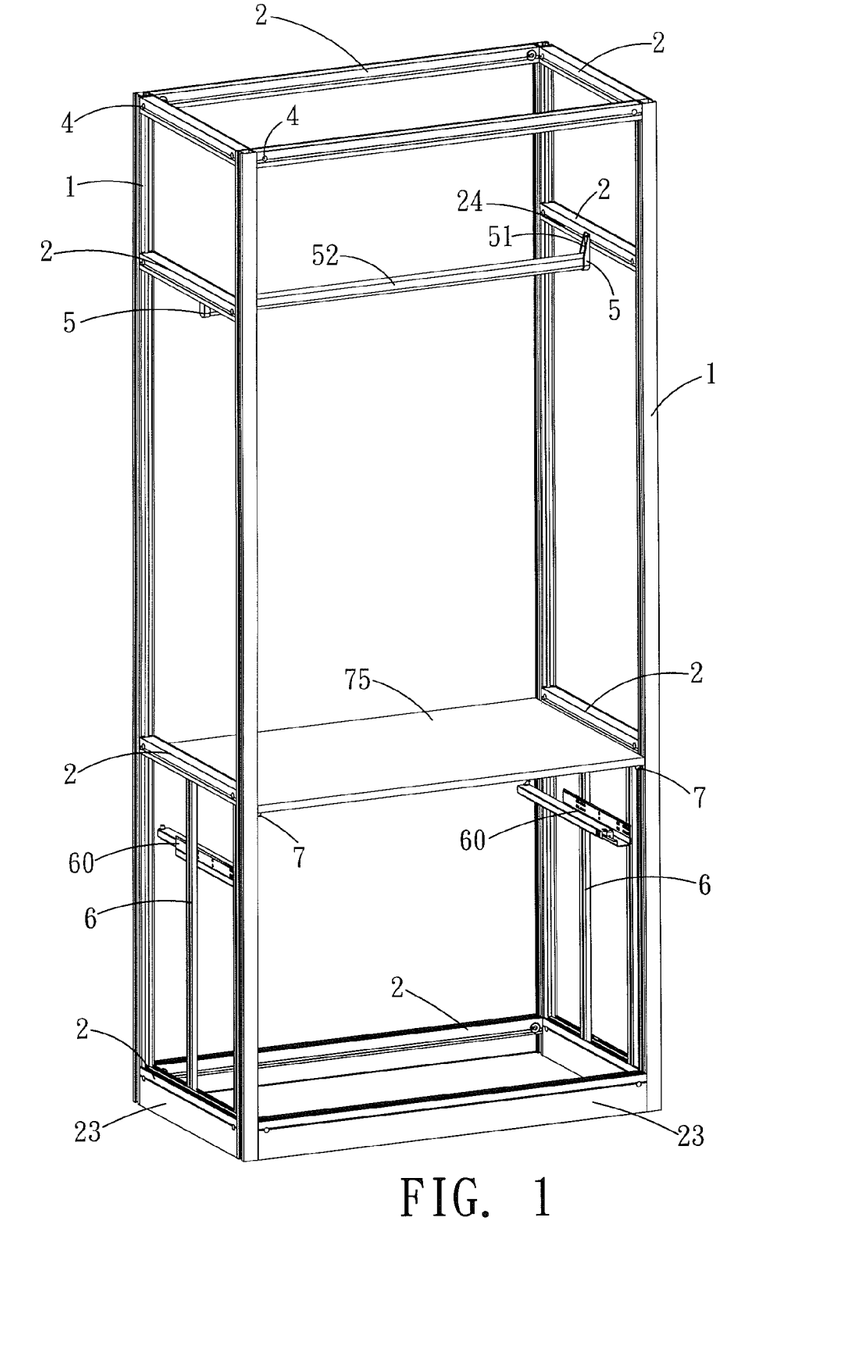
FIG. 1 is a perspective view of a combination cabinet in accordance with the preferred embodiment of the present invention.
Figure 2:
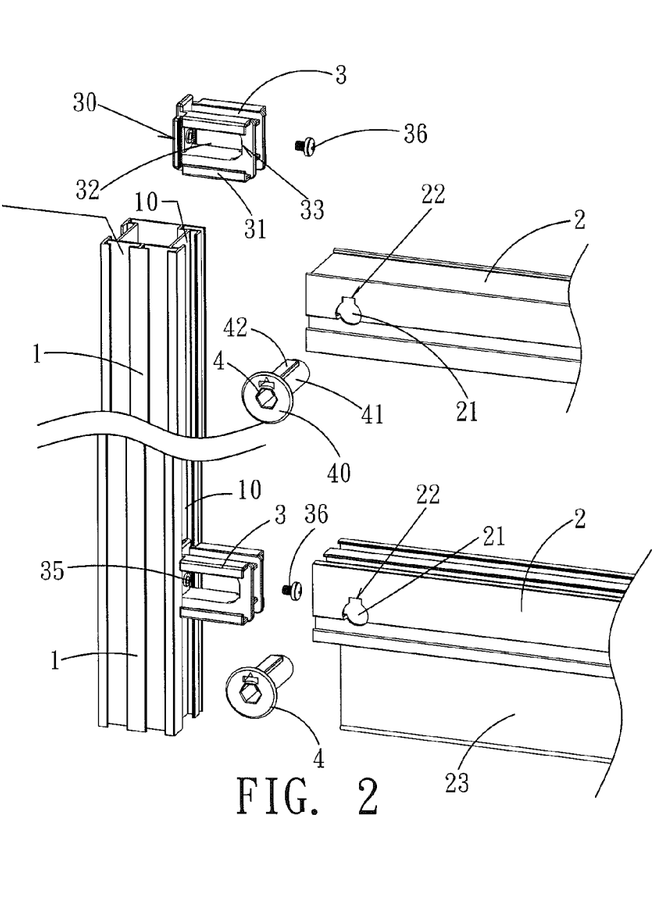
FIG. 2 is a partially exploded perspective view of the combination cabinet as shown in FIG. 1.
Figure 2A:
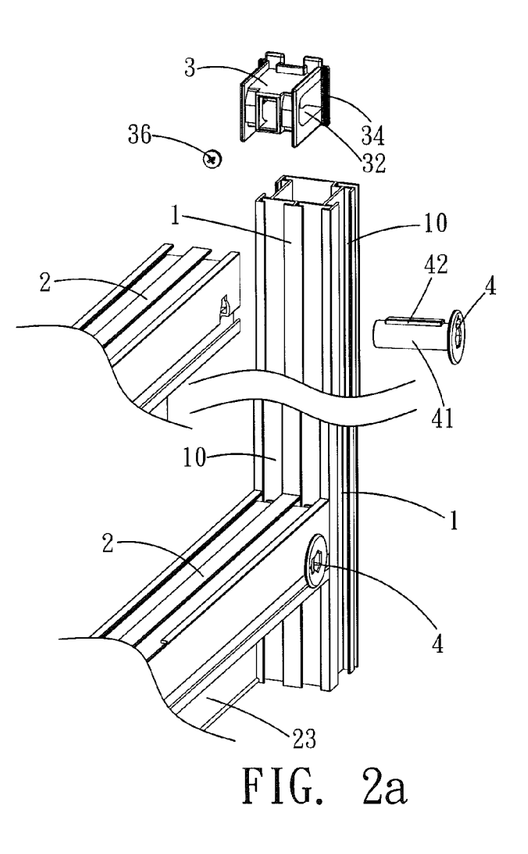
FIG. 2a is a partially exploded perspective view of the combination cabinet as shown in FIG. 1.

Each of the upright posts 1 has a periphery provided with a plurality of guide tracks 10 (see FIGS. 2 and 2a). Each of the guide tracks 10 extends in a longitudinal direction of each of the upright posts 1.

Figure 3:
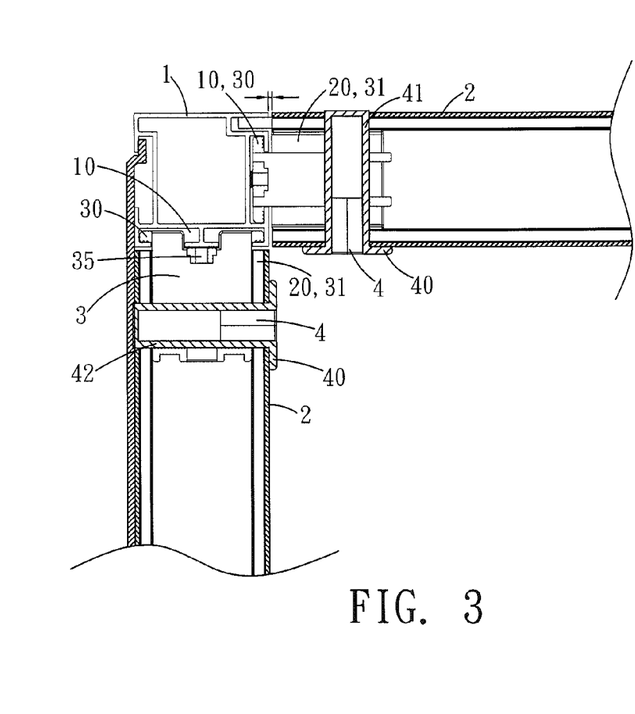
FIG. 3 is a partially top exploded cross-sectional view of the combination cabinet as shown in FIG. 1.
Figure 3A:
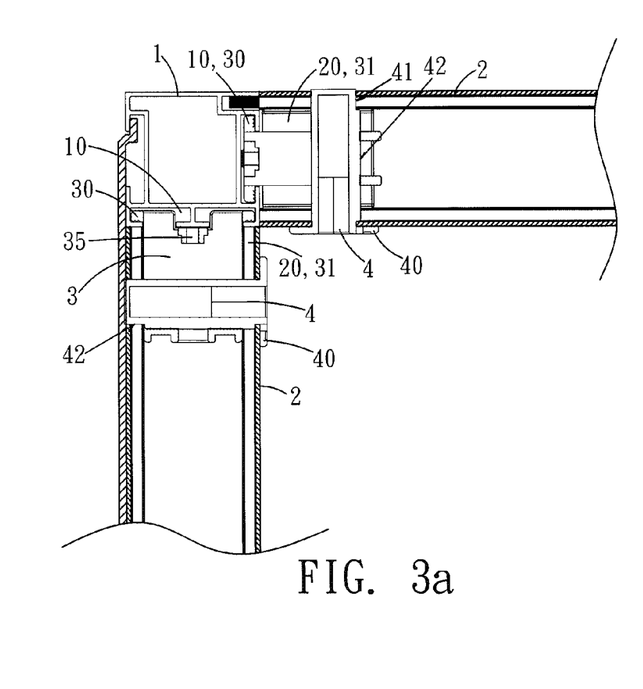
FIG. 3a is a cross-sectional assembly view of the combination cabinet as shown in FIG. 3.

Each of the crossbars 2 has an interior provided with a mounting hole 20 (see FIGS. 3 and 3a). Each of the crossbars 2 has a surface provided with a passage 21. The passage 21 of each of the crossbars 2 is connected to the mounting hole 20 and has a periphery provided with an entrance 22. Each of the crossbars 2 at lower ends of the upright posts 1 has a bottom provided with a baseboard 23.

Each of the connectors 3 has a first side provided with a guide rail 30 mounted in a respective one of the guide tracks 10 of a respective one of the upright posts 1 and a second side provided with a mounting portion 31 mounted in the mounting hole 20 of a respective one of the crossbars 2. Each of the connectors 3 has a surface provided with a slot 32. The slot 32 of each of the connectors 3 has an end provided with an abutting edge 33 aligning with the passage 21 of the respective crossbar 2. The guide rail 30 of each of the connectors 3 has a side provided with an antiskid portion 34 abutting the respective guide track 10 of the respective upright post 1 to prevent each of the connectors 3 from slipping from the respective upright post 1. The guide rail 30 of each of the connectors 3 has a surface provided with a through hole 35, and the combination cabinet further comprises a plurality of fastening members 36 each extended through the through hole 35 of a respective one of the connectors 3 and each secured on a respective one of the upright posts 1 to lock the respective connector 3 onto the respective upright post 1. Preferably, each of the fastening members 36 is a screw that is screwed into the respective upright post 1.

Figure 4:
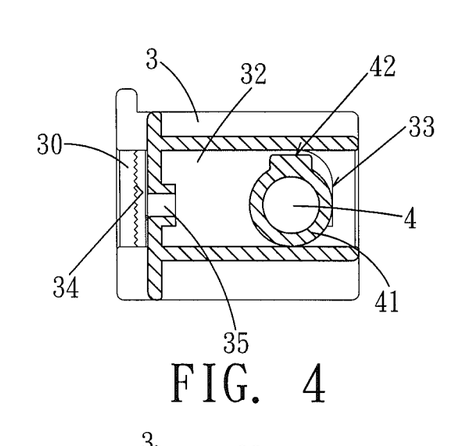
FIG. 4 is a partially front exploded cross-sectional view of the combination cabinet as shown in FIG. 1.
Figure 4A:
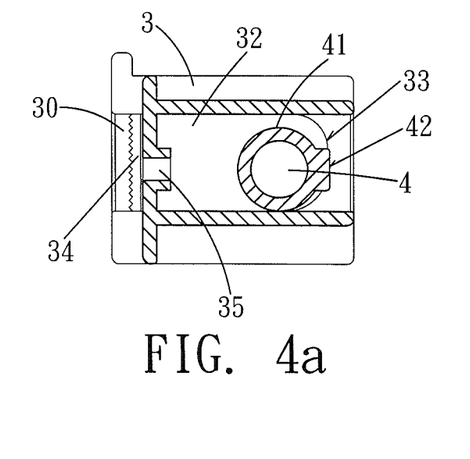
FIG. 4a is a cross-sectional operational view of the combination cabinet as shown in FIG. 4.

Each of the rotation knobs 4 has a first side provided with a connecting portion 41 extended through the passage 21 of a respective one of the crossbars 2 and the slot 32 of a respective one of the connectors 3 and a second side provided with an operation portion 40 abutting the respective crossbar 2. The connecting portion 41 of each of the rotation knobs 4 has a size flush with that of the passage 21 of the respective crossbar 2 and has a periphery provided with a pressing protrusion 42 that is extended through the entrance 22 of the passage 21 of the respective crossbar 2 and is rotatable to press the abutting edge 33 of the slot 32 of the respective connector 3 as shown in FIGS. 4 and 4a). The operation portion 40 of each of the rotation knobs 4 has a size greater than that of the passage 21 of the respective crossbar 2. Each of the rotation knobs 4 is rotatable to press the respective upright post 1, the respective crossbar 2 and the respective connector 3. The connecting portion 41 of each of the rotation knobs 4 is slidable in the slot 32 of the respective connector 3.

In assembly, the guide rail 30 of each of the connectors 3 is inserted into the respective guide track 10 of the respective upright post 1, and the mounting portion 31 of each of the connectors 3 is inserted into the mounting hole 20 of the respective crossbar 2. Then, the connecting portion 41 of each of the rotation knobs 4 extends through the passage 21 of the respective crossbar 2 and the slot 32 of the respective connector 3 and abuts the abutting edge 33 of the slot 32 of the respective connector 3 as shown in FIG. 4. At this time, the pressing protrusion 42 of each of the rotation knobs 4 extends through the entrance 22 of the passage 21 of the respective crossbar 2. Then, each of the rotation knobs 4 is rotated so that the pressing protrusion 42 of each of the rotation knobs 4 is moved to press the abutting edge 33 of the slot 32 of the respective connector 3 as shown in FIG. 4a. At this time, each of the connectors 3 is limited by the respective upright post 1 and cannot be moved any more, so that when the pressing protrusion 42 of each of the rotation knobs 4 presses the abutting edge 33 of the slot 32 of the respective connector 3, the connecting portion 41 of each of the rotation knobs 4 is pushed by a reaction from the abutting edge 33 of the slot 32 of the respective connector 3 and is moved toward the respective upright post 1. In such a manner, each of the crossbars 2 is driven by the respective rotation knob 4 to move toward the respective upright post 1 from the position as shown in FIG. 3 to the position as shown in FIG. 3a, so that each of the crossbars 2 is locked onto the respective upright post 1 by interaction of the respective connector 3 and the respective rotation knob 4. Thus, each of the crossbars 2 is combined with the respective upright post 1 solidly and stably without producing vibration. In addition, each of the crossbars 2 is locked onto or released from the respective upright post 1 by rotation of the respective rotation knob 4.

Figure 5:
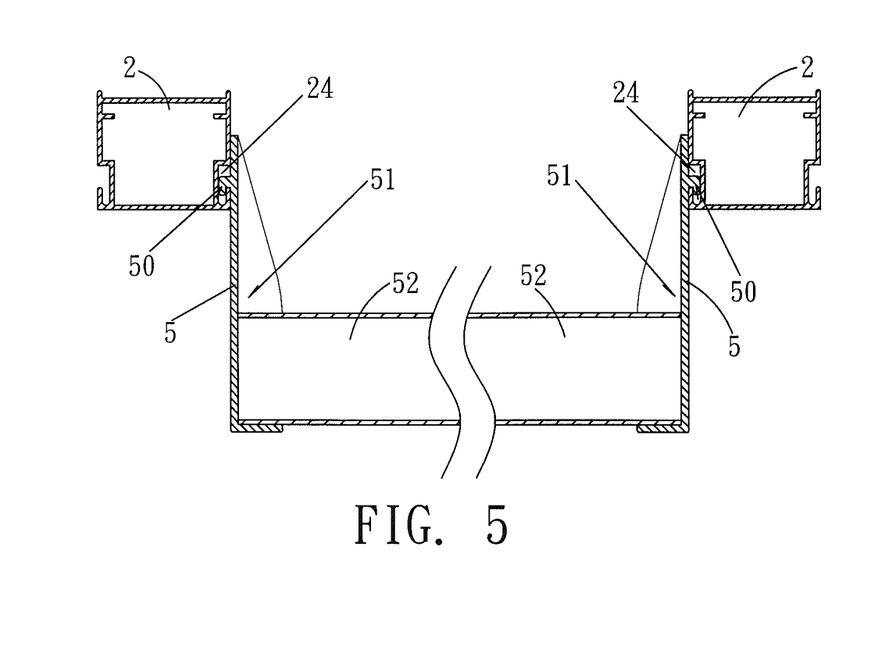
FIG. 5 is a partially front cross-sectional view of the combination cabinet as shown in FIG. 1.

Referring to FIG. 5 with reference to FIGS. 1-4, the combination cabinet further comprises at least one hanging bar 52 mounted between two of the crossbars 2, and at least two connecting brackets 5 each mounted between the hanging bar 52 and a respective one of the crossbars 2. Each of the crossbars 2 has a side provided with a fixing channel 24. Each of the connecting brackets 5 has a first end provided with a hooked portion 50 hooked into the fixing channel 24 of the respective crossbar 2 and a second end provided with a fixing recess 51. The hanging bar 52 is located between the connecting brackets 5 and has two opposite ends each mounted in the fixing recess 51 of the respective connecting bracket 5.

Figure 6:
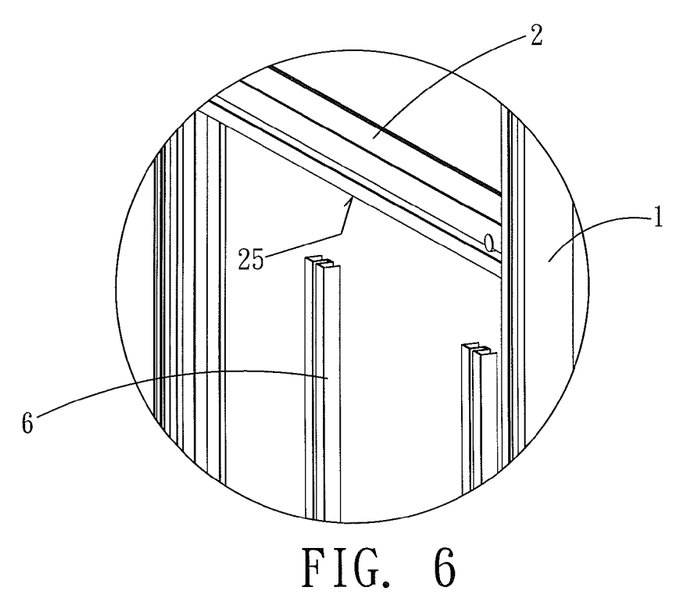
FIG. 6 is a partially exploded perspective view of the combination cabinet as shown in FIG. 1.
Figure 6A:
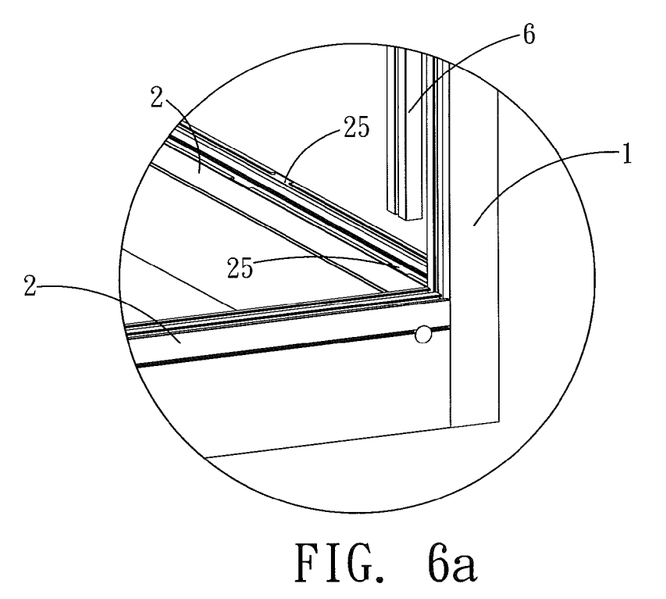
FIG. 6a is a partially exploded perspective view of the combination cabinet as shown in FIG. 1.

Referring to FIGS. 6 and 6a with reference to FIGS. 1-4, the combination cabinet further comprises at least two opposite support bars 6 each mounted between two of the crossbars 2, at least two opposite sliding tracks 60 each secured on a respective one of the support bars 6, and at least one drawer (not shown) mounted between the sliding tracks 60. Each of the crossbars 2 has a periphery provided with a retaining groove 25. Each of the support bars 6 has two opposite ends each secured in the retaining groove 25 of a respective one of the crossbars 2.

Figure 7:
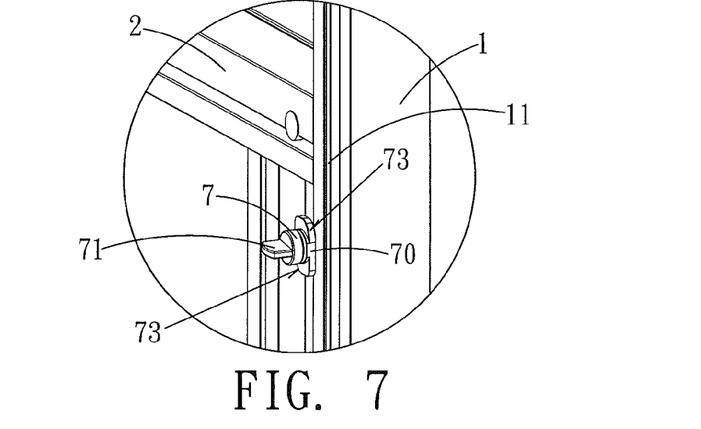
FIG. 7 is a locally perspective enlarged view of the combination cabinet as shown in FIG. 1.
Figure 7A:
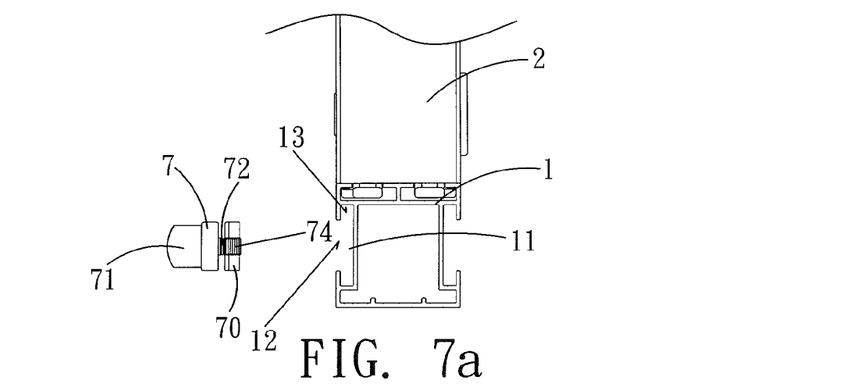
FIG. 7a is a top exploded cross-sectional view of the combination cabinet as shown in FIG. 7.
Figure 7B:
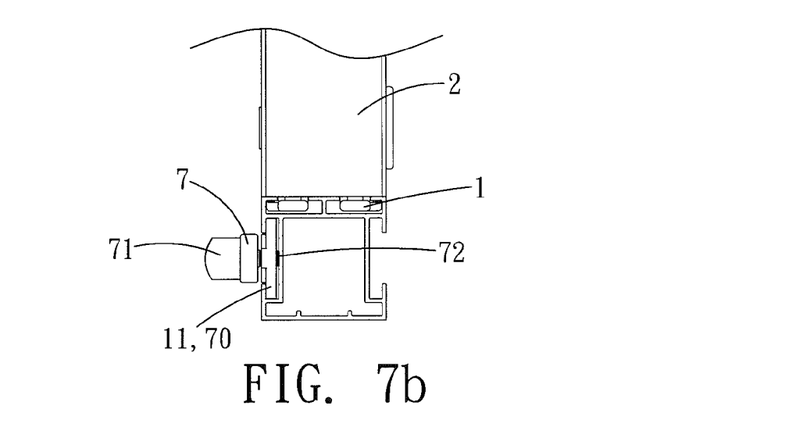
Figures 8, 8A, 8B, 8C:
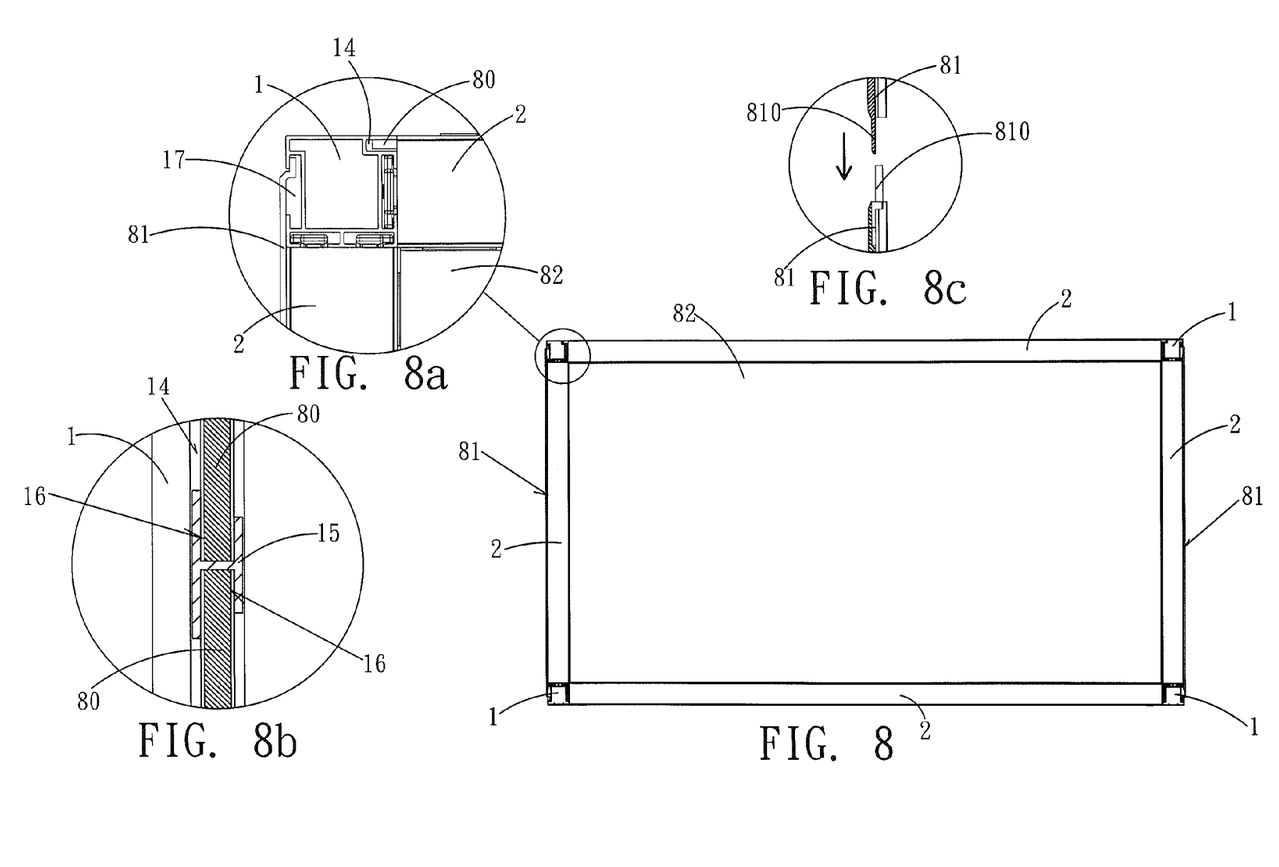
FIG. 8 is a top view of the combination cabinet as shown in FIG. 1.
FIG. 8a is a locally enlarged view of the combination cabinet as shown in FIG. 8.
FIG. 8b is a partially side cross-sectional view showing how two back plates are connected.
FIG. 8c is a partially side exploded cross-sectional view showing how two side plates are connected.

Referring to FIGS. 7, 7a and 7b with reference to FIGS. 1-4, the combination cabinet further comprises a plurality of bearing modules 7 each mounted on a respective one of the upright posts 1, and a separation plate 75 mounted between the bearing modules 7. Each of the upright posts 1 has a surface provided with a mounting channel 11 for mounting the respective bearing module 7. The mounting channel 11 of each of the upright posts 1 has a first end provided with a limit portion 12 and a second end provided with a receiving portion 13 having a width greater than that of the limit portion 12. Each of the bearing modules 7 includes a base 70 mounted in the receiving portion 13 and limited by the limit portion 12 of the mounting channel 11 of the respective upright post 1, a rotation member 72 rotatably mounted in the base 70, and a support member 71 connected with the rotation member 72. The base 70 of each of the bearing modules 7 has a surface provided with a connecting hole 74 and has a periphery provided with two opposite arcuate guide portion 73. The base 70 of each of the bearing modules 7 has a width slightly smaller than that of the limit portion 12 of the mounting channel 11 of the respective upright post 1 and has a length slightly greater than the width of the receiving portion 13 of the mounting channel 11 of the respective upright post 1. The rotation member 72 of each of the bearing modules 7 is extended through the connecting hole 74 of the base 70 to lock each of the bearing modules 7 onto the respective upright post 1. The separation plate 75 is located above and supported by the support members 71 of the bearing modules 7. Preferably, the connecting hole 74 of the base 70 is a screw hole, and the rotation member 72 of each of the bearing modules 7 is a threaded rod.

Referring to FIGS. 8, 8a, 8b and 8c with reference to FIGS. 1-4, the combination cabinet further comprises at least one back plate 80 mounted between two of the upright posts 1 at a rear part of the combination cabinet to close the rear part of the combination cabinet. Each of the upright posts 1 is provided with a back plate channel 14 for mounting the back plate 80. In another preferred embodiment of the present invention, the combination cabinet comprises a plurality of back plates 80 each mounted between two of the upright posts 1. The back plates 80 laminate each other. The back plate channel 14 is provided with a plurality of connecting seats 15 mounted between two of the back plates 80 so that the back plates 80 are connected and supported by the connecting seats 15. Each of the connecting seats 15 has an upper end and a lower end each provided with a locating recess 16 for mounting each of the back plates 80. The combination cabinet further comprises at least two side plates 81 each mounted between two of the upright posts 1 at two opposite sides of the combination cabinet to close the two opposite sides of the combination cabinet. Each of the upright posts 1 is provided with a side plate channel 17 for mounting each of side plates 81. In another preferred embodiment of the present invention, the combination cabinet comprises a plurality of side plates 81 each mounted between two of the upright posts 1. The side plates 81 laminate each other. Each of the side plates 81 is provided with a linking portion 810, and the linking portions 810 of the side plates 81 are connected together.

Figure 9:
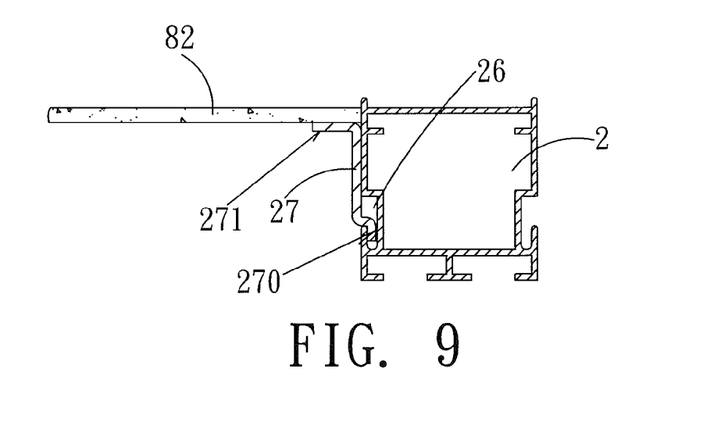
FIG. 9 is a partially front cross-sectional view of a combination cabinet in accordance with another preferred embodiment of the present invention.

Referring to FIG. 9 with reference to FIGS. 1-4, the combination cabinet further comprises a top plate 82 mounted between the crossbars 2 at an upper part of the combination cabinet to close the upper part of the combination cabinet, and a plurality of upper fixing brackets 27 each mounted on a respective one of the crossbars 2 to support the top plate 82. Each of the crossbars 2 is provided with a fixing groove 26. Each of the upper fixing brackets 27 has a first end provided with a fixing portion 270 secured in the fixing groove 26 of the respective crossbar 2 and a second end provided with a support portion 271 for supporting the top plate 82. The top plate 82 is supported by the support portion 271 of each of the upper fixing brackets 27.

Figure 10:
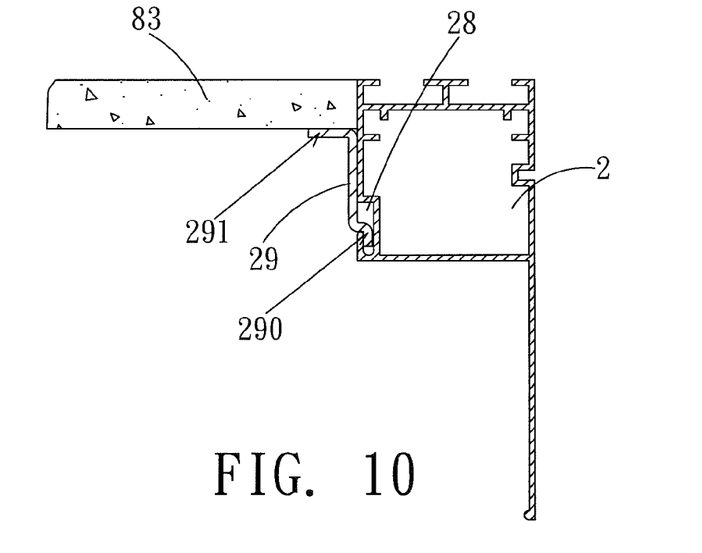
FIG. 10 is a partially front cross-sectional view of a combination cabinet in accordance with another preferred embodiment of the present invention.

Referring to FIG. 10 with reference to FIGS. 1-4, the combination cabinet further comprises a bottom plate 83 mounted between the crossbars 2 at a lower part of the combination cabinet to close the lower part of the combination cabinet, and a plurality of lower fixing brackets 29 each mounted on a respective one of the crossbars 2 to support the bottom plate 83. Each of the crossbars 2 is provided with a locating groove 28. Each of the lower fixing brackets 29 has a first end provided with a fixing section 290 secured in the locating groove 28 of the respective crossbar 2 and a second end provided with a support section 291 for supporting the bottom plate 83. The bottom plate 83 is supported by the support section 291 of each of the lower fixing brackets 29.

Accordingly, the upright posts 1 and the crossbars 2 are combined together solidly and stably by interaction of the connectors 3 and the rotation knobs 4 so that the combination cabinet has a steady-state structure without producing vibration easily. In addition, when the crossbars 2 are unlocked from the upright posts 1, the crossbars 2 are moved freely relative to the upright posts 1 to adjust the position of the crossbars 2 relative to the upright posts 1 according to the practical condition, thereby satisfying the user's requirement. Further, the crossbars 2 are locked onto and unlocked from the upright posts 1 by rotation of the rotation knobs 4 so that the crossbars 2 are combined with and detached from the upright posts 1 easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A combination cabinet comprising:
a plurality of upright posts;
a plurality of crossbars arranged between the upright posts;
a plurality of connectors mounted between the plurality of upright posts and the plurality of crossbars to connect the plurality of upright posts and the plurality of crossbars;
a plurality of rotation knobs mounted between the plurality of crossbars and the plurality of connectors;
at least one hanging bar mounted between two of the plurality of crossbars; and
at least two connecting brackets each mounted between the at least one hanging bar and a respective one of the two of the plurality of crossbars; wherein:
each of the plurality of upright posts has a periphery provided with a plurality of guide tracks;
each of the plurality of crossbars has an interior provided with a mounting hole;
each of the plurality of crossbars has a surface provided with a passage;
the passage of each of the plurality of crossbars has a periphery provided with an entrance;
each of the plurality of connectors has a first side provided with a guide rail mounted in a respective one of the guide tracks of a respective one of the upright posts and a second side provided with a mounting portion mounted in the mounting hole of a respective one of the plurality of crossbars;
each of the plurality of connectors has a surface provided with a slot;
the slot of each of the plurality of connectors has an end provided with an abutting edge aligning with the passage of the respective crossbar;
each of the plurality of rotation knobs has a first side provided with a connecting portion extended through the passage of a respective one of the plurality of crossbars and the slot of a respective one of the plurality of connectors and a second side provided with an operation portion abutting the respective crossbar;
the connecting portion of each of the plurality of rotation knobs has a periphery provided with a pressing protrusion that is extended through the entrance of the passage of the respective crossbar and is rotatable to abut the abutting edge of the slot of the respective connector;
each of the plurality of rotation knobs is rotatable to affix the respective upright post, the respective crossbar and the respective connector;
each of the plurality of crossbars has a side provided with a fixing channel;
each of the at least two connecting brackets has a first end provided with a hooked portion hooked into the fixing channel of the respective one of the two of the plurality of crossbars and a second end provided with a fixing recess; and the hanging bar is located between the at least two connecting brackets and has two opposite ends each mounted in the fixing recess of one of the at least two connecting brackets.

2. The combination cabinet of claim 1, wherein the guide rail of each of the plurality of connectors has a side provided with an antiskid portion abutting the respective guide track of the respective upright post.

3. The combination cabinet of claim 1, wherein:
the guide rail of each of the plurality of connectors has a surface provided with a through hole; and
the combination cabinet further comprises a plurality of fastening members each extended through the through hole of a respective one of the plurality of connectors and each secured on a respective one of the upright posts to lock the respective connector onto the respective upright post.

4. The combination cabinet of claim 1, wherein each of the plurality of crossbars at lower ends of the plurality of upright posts has a bottom provided with a baseboard.

5. The combination cabinet of claim 1, wherein:
the combination cabinet further comprises:
    at least two opposite support bars each mounted between two of the plurality of crossbars; and
    at least two opposite sliding tracks each secured on a respective one of the at least two support bars;
each of the plurality of crossbars has a periphery provided with a retaining groove; and
each of the at least two support bars has two opposite ends each secured in the retaining groove of a respective one of the two of the plurality of crossbars.

6. The combination cabinet of claim 1, wherein:
the combination cabinet further comprises at least one back plate mounted between two of the plurality of upright posts at a rear part of the combination cabinet to close the rear part of the combination cabinet; and
each of the plurality of upright posts is provided with a back plate channel for mounting the at least one back plate.

7. The combination cabinet of claim 1, wherein:
the combination cabinet further comprises at least two side plates each mounted between two of the plurality of upright posts at two opposite sides of the combination cabinet to close the two opposite sides of the combination cabinet; and
each of the plurality of upright posts is provided with a side plate channel for mounting each of the at least two side plates.

8. The combination cabinet of claim 7, wherein:
each of the at least two side plates comprises a plurality of side plates;
each of the plurality of side plates is provided with a linking portion; and
the linking portions of the plurality of side plates are connected together.

9. The combination cabinet of claim 1, wherein:
the combination cabinet further comprises:
a top plate mounted between the plurality of crossbars at an upper part of the combination cabinet to close the upper part of the combination cabinet; and
a plurality of upper fixing brackets each mounted on a respective one of the respective plurality of crossbars to support the top plate;
each of the plurality of crossbars is provided with a fixing groove;
each of the plurality of upper fixing brackets has a first end provided with a fixing portion secured in the fixing groove of the respective crossbar and a second end provided with a support portion for supporting the top plate; and
the top plate is supported by the support portion of each of the plurality of upper fixing brackets.

10. The combination cabinet of claim 1, wherein:
the combination cabinet further comprises:
a bottom plate mounted between the plurality of crossbars at a lower part of the combination cabinet to close the lower part of the combination cabinet; and
a plurality of lower fixing brackets each mounted on a respective one of the respective plurality of crossbars to support the bottom plate;
each of the plurality of crossbars is provided with a locating groove;
each of the plurality of lower fixing brackets has a first end provided with a fixing section secured in the locating groove of the respective crossbar and a second end provided with a support section for supporting the bottom plate; and
the bottom plate is supported by the support section of each of the plurality of lower fixing brackets.

11. A combination cabinet comprising:
a plurality of upright posts;
a plurality of crossbars arranged between the upright posts;
a plurality of connectors mounted between the plurality of upright posts and the plurality of crossbars to connect the plurality of upright posts and the plurality of crossbars;
a plurality of rotation knobs mounted between the plurality of crossbars and the plurality of connectors;
a plurality of bearing modules each mounted on a respective one of the plurality of upright posts; and
a separation plate mounted between the plurality of bearing modules; wherein:
each of the plurality of upright posts has a periphery provided with a plurality of guide tracks;
each of the plurality of crossbars has an interior provided with a mounting hole;
each of the plurality of crossbars has a surface provided with a passage;
the passage of each of the plurality of crossbars has a periphery provided with an entrance;
each of the plurality of connectors has a first side provided with a guide rail mounted in a respective one of the guide tracks of a respective one of the plurality of upright posts and a second side provided with a mounting portion mounted in the mounting hole of a respective one of the plurality of crossbars;
each of the plurality of connectors has a surface provided with a slot;
the slot of each of the plurality of connectors has an end provided with an abutting edge aligning with the passage of the respective crossbar;
each of the plurality of rotation knobs has a first side provided with a connecting portion extended through the passage of a respective one of the plurality of crossbars and the slot of a respective one of the plurality of connectors and a second side provided with an operation portion abutting the respective crossbar;
the connecting portion of each of the plurality of rotation knobs has a periphery provided with a pressing protrusion that is extended through the entrance of the passage of the respective crossbar and is rotatable to abut the abutting edge of the slot of the respective connector;

each of the plurality of rotation knobs is rotatable to affix the respective upright post, the respective crossbar and the respective connector to one another;

each of the plurality of upright posts has a surface provided with a mounting channel for mounting the respective one of the bearing modules;

the mounting channel of each of the plurality of upright posts has a first end provided with a limit portion and a second end provided with a receiving portion having a width greater than that of the limit portion;

each of the plurality of bearing modules includes:
  a base mounted in the receiving portion and limited by the limit portion of the mounting channel of the respective upright post;
  a rotation member rotatably mounted in the base; and
  a support member connected with the rotation member;

the base of each of the plurality of bearing modules has a surface provided with a connecting hole and has a periphery provided with two opposite arcuate guide portions;

the base of each of the plurality of bearing modules has a width slightly smaller than that of the limit portion of the mounting channel of the respective upright post and has a length slightly greater than the width of the receiving portion of the mounting channel of the respective upright post;

the rotation member of each of the plurality of bearing modules is extended through the connecting hole of the base to lock each of the plurality of bearing modules onto the respective upright post; and the separation plate is supported by the support members of the plurality of bearing modules.

12. A combination cabinet comprising:

a plurality of upright posts;

a plurality of crossbars arranged between the plurality of upright posts;

a plurality of connectors mounted between the plurality of upright posts and the plurality of crossbars to connect the plurality of upright posts and the plurality of crossbars;

a plurality of rotation knobs mounted between the plurality of crossbars and the plurality of connectors; and a plurality of back plates each mounted between two of the plurality of upright posts at a rear part of the combination cabinet to close the rear part of the combination cabinet; wherein:

each of the plurality of upright posts has a periphery provided with a plurality of guide tracks;

each of the plurality of crossbars has an interior provided with a mounting hole;

each of the plurality of crossbars has a surface provided with a passage;

the passage of each of the plurality of crossbars has a periphery provided with an entrance;

each of the plurality of connectors has a first side provided with a guide rail mounted in a respective one of the guide tracks of a respective one of the upright posts and a second side provided with a mounting portion mounted in the mounting hole of a respective one of the plurality of crossbars;

each of the plurality of connectors has a surface provided with a slot;

the slot of each of the plurality of connectors has an end provided with an abutting edge aligning with the passage of the respective crossbar;

each of the plurality of rotation knobs has a first side provided with a connecting portion extended through the passage of a respective one of the plurality of crossbars and the slot of a respective one of the plurality of connectors and a second side provided with an operation portion abutting the respective crossbar;

the connecting portion of each of the plurality of rotation knobs has a periphery provided with a pressing protrusion that is extended through the entrance of the passage of the respective crossbar and is rotatable to abut the abutting edge of the slot of the respective connector;

each of the plurality of rotation knobs is rotatable to affix the respective upright post, the respective crossbar and the respective connector to one another;

each of the plurality of upright posts is provided with a back plate channel for mounting one of the plurality of back plates;

the back plate channel is provided with a plurality of connecting seats mounted between two of the plurality of back plates so that the plurality of back plates are connected and supported by the plurality of connecting seats; and each of the plurality of connecting seats has an upper end and a lower end each provided with a locating recess for mounting each of the plurality of back plates.

* * * * *